Figure 1:
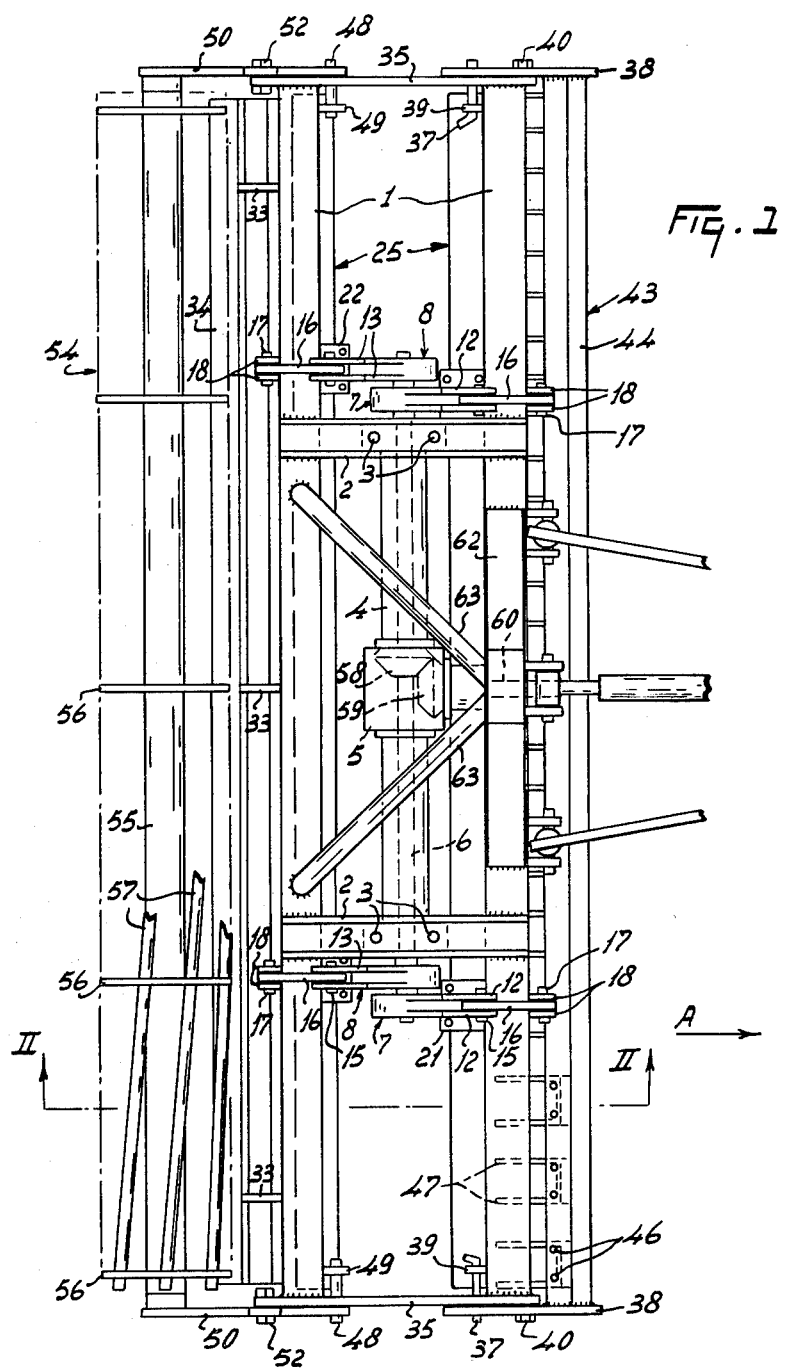

United States Patent [19]
van der Lely

[11] 4,189,006
[45] Feb. 19, 1980

[54] SOIL CULTIVATING IMPLEMENTS

[76] Inventor: Cornelis van der Lely, 7, Brüschenrain, Zug, Switzerland

[21] Appl. No.: 862,529

[22] Filed: Dec. 20, 1977

[30] Foreign Application Priority Data

Dec. 21, 1976 [NL] Netherlands .................. 7614181

[51] Int. Cl.² .................. A01B 27/00; A01B 11/00
[52] U.S. Cl. .................. 172/68; 172/56; 172/70; 172/118; 172/125; 172/681; 172/691; 172/767
[58] Field of Search .................. 172/49, 53, 56, 145, 172/60, 767, 63, 197, 68, 42, 70, 72, 48, 102, 97, 101, 148, 118, 191, 681

[56] References Cited

U.S. PATENT DOCUMENTS

| | | | |
|---|---|---|---|
| 640,514 | 1/1900 | Ernst | 172/197 |
| 1,094,313 | 4/1914 | Dowell | 172/767 X |
| 2,871,959 | 2/1959 | Koskenmaki | 172/145 X |
| 3,823,780 | 7/1974 | Guerin | 172/53 X |
| 4,042,041 | 8/1977 | Lely | 172/49 X |

FOREIGN PATENT DOCUMENTS

| | | | |
|---|---|---|---|
| 420886 | 11/1925 | Fed. Rep. of Germany | 172/48 |
| 1224077 | 9/1966 | Fed. Rep. of Germany | 172/102 |
| 1564217 | 4/1969 | France | 172/53 |
| 22398 | 6/1930 | Netherlands | 172/97 |
| 92902 | 2/1922 | Switzerland | 172/42 |
| 2065 | of 1856 | United Kingdom | 172/48 |

*Primary Examiner*—Paul E. Shapiro
*Attorney, Agent, or Firm*—Mason, Mason and Albright

[57] ABSTRACT

An implement has rows of tines on carrier supports that are elongated and extend transverse to the direction of travel. A transmission shaft with pairs of eccentrics is positioned between the supports and connected to move the tines of the supports to and fro in relatively opposite directions. The eccentrics are in pairs and interconnected to the frame by adjustable links that control the operative movements of the tines, those movements being in the direction of travel. A pulverizing member is pivoted to the rear carrier support to move with same and a front soil levelling member with strip-shaped members is positioned in front of the tines. Preferably, a supporting roller is connected to the frame at the rear of the pulverizing member.

30 Claims, 8 Drawing Figures

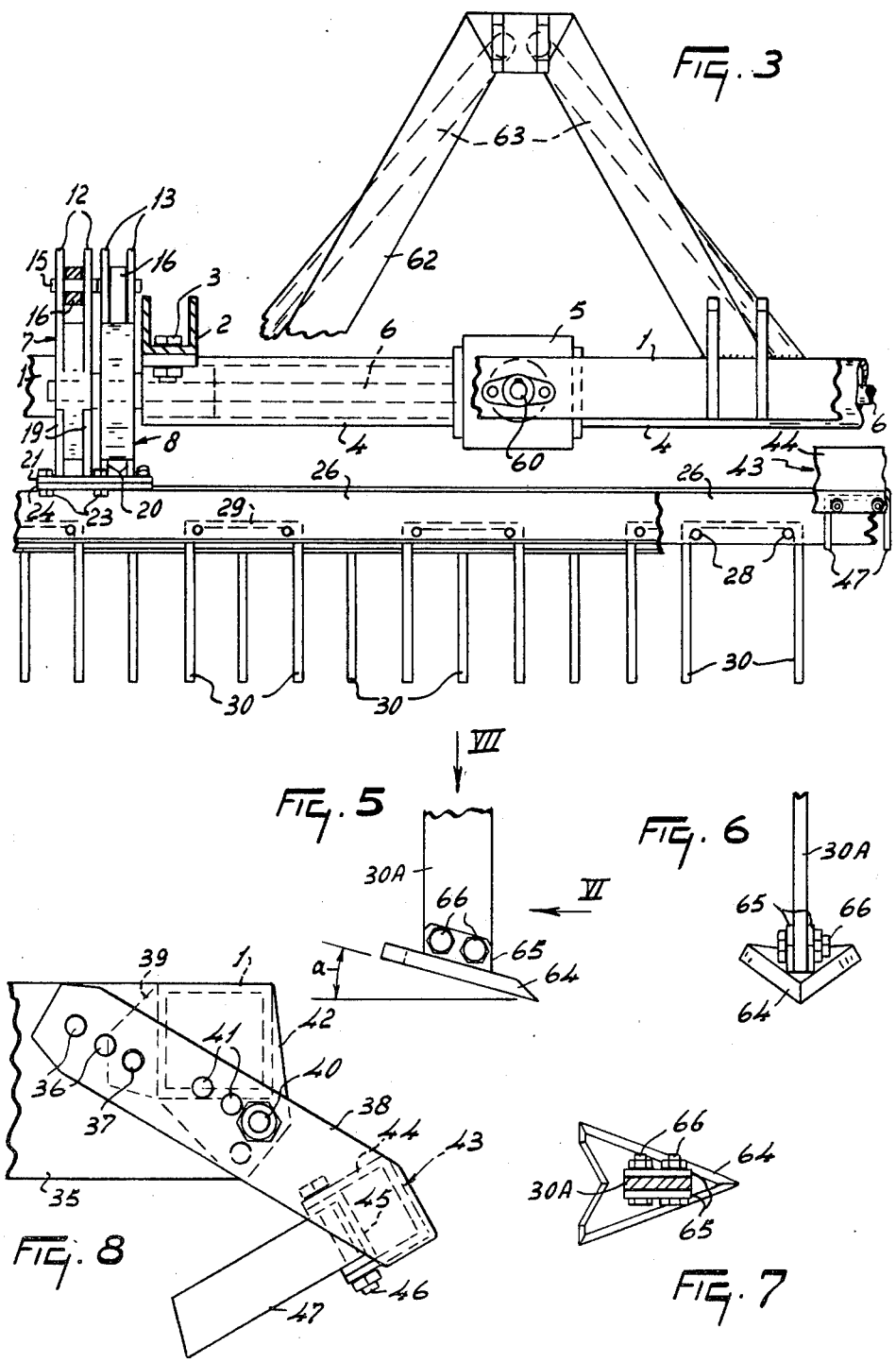

SOIL CULTIVATING IMPLEMENTS

This invention relates to soil cultivating implements or machines of the kind which comprise a plurality of soil working members that are movable about an axis which extends substantially horizontally perpendicular, or at least transverse, to the intended direction of operative travel of the implement or machine. The expression "implement(s) or machine (s)" will be shortened to "implement(s)" alone throughout the remainder of this specification for the sake of brevity.

According to one aspect of the invention, there is provided a soil cultivating implement of the kind set forth, wherein two separate rows of the soil working members are arranged to be movable about said axis in such a way that, at any instant during operation of the implement at which the members of one of the two rows are moving in one direction, the members of the other one of said two rows will be moving in a substantially opposite direction.

Figure 2:
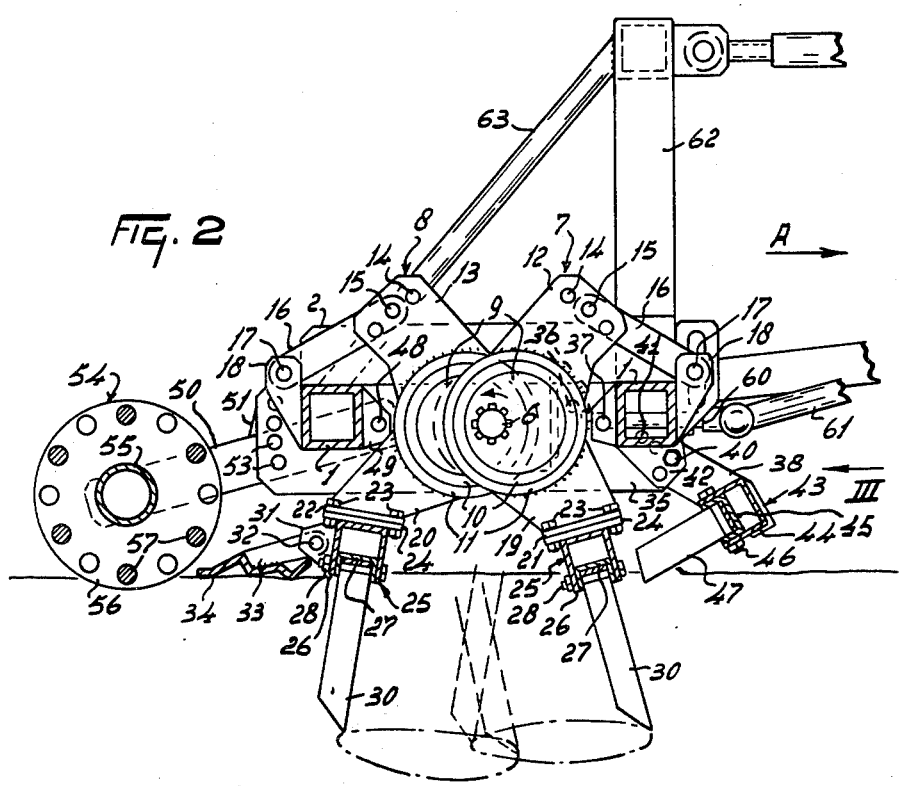
Figure 4:
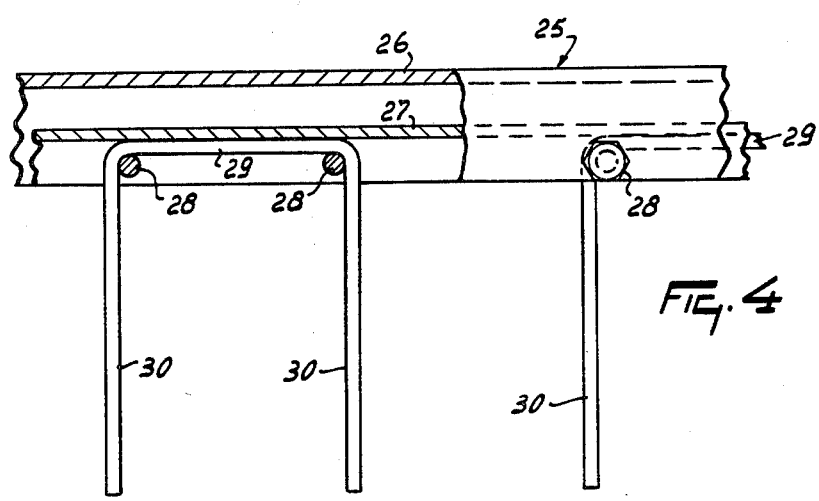

For a better understanding of the invention, and to show how the same may be carried into effect, reference will now be made, by way of example, to the accompanying drawings, in which:

FIG. 1 is a plan view of a soil cultivating implement in accordance with the invention connected to the rear of an agricultural tractor, FIG. 2 is a section, to an enlarged scale, taken on the line II—II in FIG. 1, FIG. 3 is a partial front elevation, to an enlarged scale, as seen in the direction indicated by an arrow III in FIG. 2, FIG. 4 is a part-sectional elevation, to an enlarged scale, illustrating the construction and mounting of parts that can be seen in FIGS. 2 and 3 of the drawings in greater detail, FIG. 5 is a side elevation to the same scale as FIG. 4 illustrating the construction and arrangement of alternative soil working parts, FIG. 6 is an elevation as seen in the direction indicated by an arrow VI in FIG. 5, FIG. 7 is a plan view as seen in the direction indicated by an arrow VII in FIG. 5, and FIG. 8 is a side elevation illustrating the construction and arrangement of parts that can be seen in the sectional view of FIG. 2 to an enlarged scale and in greater detail.

Referring to the accompanying drawings, the soil cultivating implement that is illustrated therein has a frame which comprises two parallel beams 1 that both extend substantially horizontally transverse, and usually (as illustrated) substantially perpendicular, to the intended direction of operative travel of the implement that is indicated by an arrow A in FIGS. 1 and 2 of the drawings, said beams 1 being spaced apart from one another in that direction. Each beam 1 is of hollow formation and has a polygonal cross-section which is preferably, but not essentially, the square cross-section that is illustrated in the drawings so that at least one outer surface of each beam 1 can be horizontally or substantially horizontally disposed. The two beams 1 are rigidly interconnected by two tie beams 2 which are spaced by equal distances from the midpoints of the two beams 1. The two tie beams 2 both extend substantially horizontally parallel to the direction A and thus substantially parallel to one another and each of them has a channel-shaped cross-section, being disposed with the web or base of the channel lowermost and the two limbs projecting substantially vertically upwards therefrom. The lower surface of the web or base of each tie beam 2 is welded or otherwise rigidly secured to the substantially horizontal upper surfaces of the two frame beams 1. A tube 4 extends substantially horizontally parallel to the two frame beams 1 at a location which is substantially midway between those two beams, with respect to the direction A, said tube 4 being provided with fastening lugs by which it is firmly but releasably secured to the lower surfaces of the webs or bases of the two tie beams 2 by substantially vertically disposed bolts 3. The tube 4 is interrupted, at a location midway along its length, by the provision of a gear box 5. A substantially horizontally disposed rotary shaft 6 extends substantially axially through the tube 4, and the gear box 5, and has opposite end portions which project by significant distances beyond the corresponding ends of the tube 4, the axial length of the shaft 6 being greater than that of the tube 4.

Each portion of the shaft 6 that projects beyond a corresponding end of the tube 4 is provided with two closely neighbouring eccentric mechanisms 7 and 8. Each of the four mechanisms 7 and 8 comprises an eccentric disc 9 which is connected to the corresponding portion of the shaft 6 by co-operating splines (see FIG. 2) so that said disc 9 will be fast in rotation with the shaft 6 when the implement is in use. The discs 9 of the two eccentric mechanisms 7 that are located close to the opposite ends of the shaft 6 are in the same angular positions, as regards their eccentricities, about the longitudinal axis of that shaft and this is equally true of the eccentric discs 9 of the two eccentric mechanisms 8 but it will be apparent from FIG. 2 of the drawings that the discs 9 of the mechanisms 7 are angularly displaced by 180° about the longitudinal axis of the shaft 6 in relation to the discs 9 of the two mechanisms 8 as regards the eccentricities of those respective discs. The outer surface of each disc 9 is surrounded by the inner race of a corresponding ball bearing 10 and the outer race of each ball bearing 10 is, in turn, surrounded by the inner surface of a corresponding output element in the form of a ring 11. FIG. 2 of the drawings illustrates a position of the shaft 6 in which major portions of the two eccentric mechanisms 7 are located in advance of that shaft with respect to the direction A whereas major portions of the two mechanisms 8 are located to the rear of the shaft 6 with respect to the same direction. The top of each ring 11 of each mechanism 7 is provided with a corresponding pair of spaced but parallel obliquely upwardly projecting lugs 12 and the top of each ring 11 of each mechanism 8 is provided with a similarly arranged pair of lugs 13 (FIG. 3). However, as will be apparent from FIG. 2 of the drawings, in the position of the shaft 6 which is shown in that Figure, the two lugs 12 of each mechanism 7 project obliquely upwardly and forwardly with respect to the direction A whereas the two lugs 13 of each mechanism 8 project obliquely upwardly and rearwardly relative to the same direction, the directions of inclination being inclined to one another by substantially 90° as seen in FIG. 2. The two lugs of each pair of lugs 12 and 13 are both formed, near to their oblique upper edges, with corresponding curved rows of three holes 14, the center of curvature of each row of holes 14 being substantially coincident with the longitudinal axis of the shaft 6.

Substantially horizontally disposed pivot bolts 15 are employed to connect any chosen aligned pair of holes 14 in the corresponding pair of lugs 12 or 13 to one end of a corresponding control member in the form of a control link 16 which control link is of strip-shaped configuration and is arranged turnably between the two lugs 12 or 13 of the corresponding pair. The end of each control link 16 that is remote from the corresponding pivot bolt 15 is turnably connected by a parallel pivot pin 17 to a pair of lugs 18 that are secured either to the front upright surface of the leading frame beam 1, with respect to the direction A, or to the hindmost upright surface of the rear frame beam 1 (see FIG. 2), each control link 16 being turnably engaged between the two lugs 18 of the corresponding pair. A lower region of each ring 11 of each eccentric mechanism 7 is provided with a corresponding downwardly projecting support bracket 19 and, similarly, a lower region of each ring 11 of each eccentric mechanism 8 is provided with a downwardly projecting support bracket 20. When the shaft 6 occupies the position thereof that is shown in FIG. 2 of the drawings, the support brackets 19 project obliquely downwardly and forwardly with respect to the direction A while the support brackets 20 project obliquely downwardly and rearwardly relative to that direction. It is noted that, in the position illustrated in FIG. 2 of the drawings, the free ends of the support brackets 19 are at the furthest distance which they attain, considered in the direction A, from the free ends of the support brackets 20. A lower edge of each support bracket 19 is provided with a corresponding perpendicular disposed support plate 21 and the lower edge of each support bracket 20 is provided with a corresponding perpendicularly disposed support plate 22, it being noted that, in the position which is illustrated in FIG. 2 of the drawings, each support plate 21 extends obliquely upwardly and forwardly at a few degrees to the horizontal with respect to the direction A while each support plate 22 extends obliquely downwardly and forwardly at a few degrees to the horizontal relative to that direction.

The two support plates 21 that correspond to the two eccentric mechanisms 7 have corresponding plates 24 firmly but releasably fastened to them by bolts 23 and, similarly, the two support plates 22 that correspond to the two eccentric mechanisms 8 have two more of the support plates 24 firmly but releasably fastened to them by further bolts 23. The top of a carrier beam 25 is welded or otherwise rigidly secured to the two plates 24 which are connected to the two support plates 21 and a second substantially identical carrier beam 25 has its top welded or otherwise rigidly secured to the two plates 24 that are connected to the two support plates 22, said carrier beams 25 being in parallel or substantially parallel relationship with one another and with the frame beams 1. Each carrier beam 25 comprises an outer beam 26 of channel-shaped cross-section, the two or base of that beam being uppermost and affording the top of the carrier beam 25 concerned that is fixedly secured to the respective pair of plates 24. The limbs of each outer beam 26 thus project obliquely downwardly from the web or base thereof and an inner beam 27 that is also of channel-shaped cross-section, arranged in a substantially inverted position, is fastened between the downwardly projecting limbs of the outer beam 26 concerned. It can be seen from the drawings that the beams 27 have smaller dimensions than the beams 26 and next between the limbs of the corresponding outer beams 26, the free edges of the limbs of both beams 26 and 27 of each carrier beam 25 being in registering relationship although each inner beam 27 has limbs which project from the web or base thereof by a considerably reduced distance as compared with the projection of the limbs of each outer beams 26 from the web or base of that beams. Bolts 28 that are arranged at more or less regular intervals along the length of each carrier beam 25 firmly but releasably interconnect the overlapping limbs of the outer and inner beams 26 and 27 thereof and it will be seen from the drawings that successive pairs of the bolts 28 also connect common fastening portions 29 of integral pairs of soil working members, in the form of tines 30, to the carrier beams 25. Each integral pair of tines 30 is formed from a length of spring steel or other strip-shaped material which is of inverted channel configuration as seen in FIGS. 3 and 4 of the drawings. The strip-shaped tine material has a width between its leading and rear edges that is substantially the same as the distance between the inner surfaces of the limbs of each inner beam 27 and it will be evident from FIG. 4 of the drawings that the two bolts 28 which firmly but releasably secure each integral pair of tines 30 in appointed position are engaged in the 90° angular bends between the common fastening portion 29 of that pair of tines 30 and the two lines 30 themselves. Each tine 30 is of substantially planar configurations, the plane thereof being perpendicular to the longitudinal axis of the corresponding carrier beam 25 and parallel or substantially parallel to the direction A. FIG. 2 of the drawings shows that, at its lower free end, each tine 30 is obliquely bevelled, that acute angle at the end of the bevelled edge being foremost with respect to the direction A so that each bevelled edge extends upwardly and rearwardly relative to that direction from the point that is defined by said acute angle.

Lugs 31 project rearwardly from the outer beam 26 of the rear carrier beam 25 at locations which are close to the opposite ends of that carrier beam and at substantially the midpoint thereof. Substantially horizontally aligned pivot pins 32 turnably connect corresponding arms 33 to the three lugs 31, said arms 33 extending generally downwardly and rearwardly from the lugs 31 with respect to the direction A and having a soil levelling and crumbling member 34 rigidly secured to their rear ends and their lower edges. The soil levelling member 34 is formed from a bent sheet metal plate or other sheet material and has the cross-sectional shape that can be seen in FIG. 2 of the drawings, said shape being such as to define two consecutive, but spaced in the direction A, downwardly projecting ribs which ribs will, of course, bear against the ground surface as shown in FIG. 2 of the drawings when the implement is in use. A leading edge region of the member 34, with respect to the direction A, projects upwardly and forwardly away from the first rib to terminate in a free edge which is spaced above ground level whereas a rear edge region of the member 34, also with respect to the direction A, is substantially horizontally disposed and thus defines a lower surface which will contact the upper surface of the soil when the implement is in use.

The corresponding ends of the two frame beams 1 are rigidly interconnected by substantially vertical side plates 35 which are in parallel relationship with each other and parallel or substantially parallel relationship with the direction A. The two side plates 35 are both formed, just behind the leading frame beam 1 with respect to the direction A, with a single hole that is in register with a substantially horizontally aligned hole that is formed in a lug 39 which projects rearwardly from the rear surface of the leading frame beam 1 at a short distance from the side plate 35 concerned. The holes in each lug 39 and the corresponding side plate 35 are arranged to receive a horizontal pin 37 whose tip can be entered selectively through any chosen one of a plurality, such as three, of holes 36 which are formed in a corresponding arm 38 that lies against the outer surface of the respective side plate 35 and that is inclined downwardly and forwardly, with respect to the direction A, from its rear to its front (see FIGS. 1, 2 and 8 of the drawings). Each arm 38 is turnable upwardly and downwardly alongside the corresponding plate 35 about the respective pin 37 but can be retained in any chosen one of a plurality (two, in the example that is being described) of angular position about the corresponding pin 37. The chosen angular position is maintained by entering a bolt 40 substantially horizontally through the appropriate one of two (in this example) holes that are formed in a corresponding lug 42 that is secured to the leading frame beam 1, the holes in said lug 42 being equidistant from the axis of the respective pin 37. The bolt 40 is also entered through a hole 41 (FIG. 8) in the arms 38 concerned and it will be seen from FIG. 8 that there are as many of the holes 41 as there are of the holes 36 and that said holes 41 are positioned relative to one another in the same way as are the holes 36. Thus, the particular hole 41 that is chosen for co-operation with the bolt 40 will depend upon the particular hole 36 that co-operates with the corresponding pin 37 and this arrangement enables the arms 38 to project forwardly and downwardly with respect to the direction A by different distances as well as being angularly adjustable to different positions about the axis that is defined by the two substantially horizontally aligned pins 37. The leading lower ends of the two arms 38 are rigidly interconnected by a carrier beam 43 that is very similar in construction to either of the carrier beam 25 that have been described above, the carrier beam 43 comprising an outer beam 44 of channel-shaped cross-section and an inner beam 45 of the same cross-section that is nested in the outer beam 44 in such a way that the free edges of the two limbs of both beams 44 and 45 are substantially coplanar. However, as will be apparent from FIGS. 2 and 8 of the drawings, the carrier beam 43 is so disposed that the limbs of both its constituent outer and inner beams 44 and 45 project downwardly and rearwardly with respect to the direction A from the bases thereof. Common fastening portions of integral pairs of elongate elements in the form of spring steel or other strip-shaped tines 47 are firmly but releasably secured to the carrier beam 43 by pairs of more or less regularly spaced apart bolts 46 which bolts 46 also act to secure the outer and inner beams 44 and 45 of the carrier beam 43 firmly but releasably to one another. It will be apparent from FIGS. 1 to 3 of the drawings that each integral pair of tines 47 is basically of similar construction to one of the previously described integral pairs of tines 30, the general plane of each substantially straight strip-shaped tine 47 being parallel or substantially parallel to the direction A. However, in this case, the free end of each tine 47 is not steeply bevelled, as are the free ends of the tines 30, but is bevelled by only a very few degrees (see FIG. 2) so that the acute angle of a little less than 90° at one end of the bevelled edge of each tine 47 is lowermost whilst the obtuse angle of a little more than 90° at the opposite end of that edge is uppermost. The common fastening portion of each pair of tines 47 lies between the limbs of the inner beam 45 of the carrier beam 43 and has a width which is substantially equal to the distance between the inner surfaces of those limbs.

The side plates 35 of the implement frame are provided, immediately in advance of the rear frame beam 1 relative to the direction A, with substantially horizontally aligned stub shafts 48 whose inner ends are lodged, for strengthening and stabilising purposes, in lugs 49 which project forwardly from the leading surface of the rear frame beam 1 at short distances from the two side plates 35. The stub shafts 48 project beyond the relatively remote outer surfaces of the two side plates 35 and arms 50 are turnable upwardly and downwardly alongside the plates 35 about these projecting portions of the two stub shafts 48. The arms 50 project generally rearwardly from the stub shafts 48 with respect to the direction A and the upper edge of each arm 50 carries a corresponding lug 51. The two side plates 35 project rearwardly with respect to the direction A beyond the hindmost frame beam 1 and the rearwardly projecting portions thereof are formed with curved rows of holes 53 that are equidistant from the axis which is defined by the aligned stub shafts 48. The lugs 51 are formed with holes at the same distance from said axis and retaining bolts 52 can be entered through the holes in the lugs 51 and chosen ones of the holes 53 to maintain the arms 50 reliably but releasably in a corresponding angular setting about the axis that is defined by the stub shafts 48. The rearmost ends of the two arms 50, with respect to the direction A, carry substantially horizontally aligned bearings between which a roller 54 of open-work cage-formation is freely rotatable, said roller 54 extending throughout substantially the whole of the working width of the tines 30 and tines 47. The roller 54 has a central axially extending tubular support 55 to which a plurality, such as five, of vertically disposed circular support plates 56 are secured in parallel relationship with one another and parallel or substantially parallel relationship with the direction A. The support plates 56 are spaced apart from one another at regular intervals along the central support 55, there being two of them located close to the opposite ends of the latter. Each support plate 56 is formed close to its edge with a circular row of holes that are spaced apart from one another at regular angular intervals around the longitudinal axis of the central support 55. Elongate elements 57 that are of solid rod-like formation are entered lengthwise through appropriate ones of the holes in the successive support plates 56 and are arranged to extend helically around the axis of rotation of the roller 54. The elements 57 could, if preferred, be of tubular formation rather than being solid. In the embodiment which is being described, each support plate 56 has twelve holes but it will be seen from FIG. 2 of the drawings that it is not necessary to provide an equal number of the elements 57. The roller 54 is illustrated as having six of the elements 57 but the number thereof may be increased or decreased, as may be necessary, to match the nature and condition of the soil that is to be dealt with.

The gear box 5 that is located midway along the length of the tube 4 contains a bevel pinion 58 that is secured to the shaft 6 which extends through the gear box 5 and the tube 4. The bevel pinion 58 has its teeth in driven mesh with those of a second bevel pinion 59 that is secured to a shaft 60, the latter shaft projecting substantially horizontally forwards from the gear box 5 through aligned openings, at least one of which is provided with a bearing, in the leading frame beam 1 (see FIGS. 2 and 3), its foremost end being splined or otherwise keyed to enable it to serve as a rotary input shaft of the implement drive transmission. The leading end of the shaft 60 is intended to be placed in driven connection with the rear power take-off shaft of an agrigultural tractor or other operating vehicle of the implement through the intermediary of a telescopic transmission shaft 61, which is of a construction that is known per se, having universal joints at its opposite ends. The leading frame beam 1 with respect to the direction A is provided, midway between the planes of the two side plates 35, with a coupling member or trestle 62 that is of substantially triangular configuration when seen in front or rear elevation (see FIG. 3). The coupling member or trestle 62 comprises an upper coupling point and horizontally spaced apart lower coupling points that are arranged for connecting the frame of the implement to the three-point lifting device or hitch at the rear of an agricultural tractor or other operating vehicle in a manner that is generally known per se and that is illustrated some what diagrammatically in FIGS. 1 and 2 of the drawings. Substantially the apex of the coupling member or trestle 62 is strengtheningly connected to horizontally spaced apart locations on the top of the rear frame beam 1 by two tie beams 63 that diverge downwardly and rearwardly with respect to the direction A from said apex to said locations on the rear frame beam 1.

In the use of the soil cultivating implement that has been described, the coupling member or trestle 62 thereof is connected to the three-point lifting device or hitch at the rear of an agricultural tractor or other operating vehicle in the manner that is illustrated somewhat diagrammatically in the drawings and the rear power take-off shaft of the same tractor or other operating vehicle is placed in driving connection with the rotary input shaft 60 of the implement drive transmission by way of the known telescopic transmission shaft 61 that has universal joints at its opposite ends. The maximum depth to which the tines 30 will be able to penetrate into the soil during the use of the implement is set, before work commences, by raising or lowering the level of the axis of rotation of the roller 54 relative to the level of the implement frame. This is done by temporarily removing the retaining bolts 52 and turning the arms 50 upwardly or downwardly, as may be required, about their respective stub shafts 48, finally maintaining the newly adopted setting by replacing and tightening the bolts 52 in the holes in the lugs 51 and chosen ones of the holes 53. Adjustment of the position of the carrier beam 43 for the tines 47 may also be required as will be discussed below. As the implement moves operatively in the direction A over soil that is to be cultivated, the shaft 6 is driven from the gear box 5 and revolves rapidly in the direction which is indicated by a small arrow in FIG. 2 of the drawings. The discs 9 revolve with the shaft 6 and the rings 11 move orbitally around that shaft due to the provision of the ball bearings 10. The result is that, with the positions of adjustment that are illustrated in the drawings, the points of the tines 30 in each of the two rows thereof that correspond to the two carrier beams 25 will move through the somewhat elliptic paths that are illustrated by broken lines in FIG. 2 of the drawings, said paths being contained in substantially vertical planes that are parallel or substantially parallel to the direction A. The tines 30 are mounted on their respective carrier beams 25 in such a way that, as can be seen in FIG. 3 of the drawings, the tines 30 which correspond to one of the two carrier beams are located alternately midway between the tines 30 that correspond to the other carrier beam 25 and thus, considered in the direction A, the tines 30 of one carrier beam 25 will move through the spaces between the tines 30 that correspond to the other carrier beam 25. This arrangement provides an intensive slicing and pulverisation of the soil particularly as one row of the tines 30 will always be moving towards, or away from, the also moving tines 30 of the other row except at the instants at which the points of those tines 30 are at the leading and rear ends of their somewhat elliptic paths of movement. This will become apparent from a study of FIG. 2 of the drawings which shows tines 30 in the two rows in full and broken lines with their points at substantially the opposite leading and rear ends of their somewhat elliptic paths of movement.

If the soil that is to be dealt with comprises naturally hard or compacted subsoil, alternative soil working members in the form of tines 30A can be substituted for the integral pairs of tines 30, said tines 30A (FIGS. 5 to 7 of the drawings) being identical in construction and mounting to the tines 30 except that the lowermost end of each tine 30A has an edge which is less steeply bevelled, and thus less steeply inclined to the horizontal, than are the free lower edges of the tines 30. A comparison may be made between FIGS. 2 and 5 of the drawings in this respect. The lowermost end of each tine 30A is provided, for dealing with subsoil of the kind which has just been mentioned, with a corresponding hoe blade 64. A soil working portion of each hoe blade 64 is of basically isosceles triangular configuration (see FIG. 7) but the short edge thereof, which is arranged rearmost with respect to the direction A, is symmetrically formed, throughout most of its length, with a forwardly directed shallow V-configuration recess. Each hoe blade 64 also comprises a forked fastening portion 65 that is disposed substantially centrally on the upper surface of the substantially isosceles triangular soil working portion. Two pairs of horizontally aligned holes are formed through the two limbs of each fastening portion 65 and registering holes are formed close to the lower bevelled edge of each tine 30A. When installing each hoe blade 64, the two limbs of its fastening portion 65 are arranged at opposite sides of the corresponding tine 30A and two bolts 66 are entered substantially horizontally through the corresponding pairs of holes in the limbs of the fastening portion 65 and the respective holes in the invervening tine 30A. The bolts 66 are provided with nuts which preferably include inserts designed to prevent them from working loose when the implement is in operation. The soil working portion of each hoe blade 64 is inclined at an angle $\alpha$ (FIG. 5) to the horizontal, said angle advantageously having a magnitude of substantially 15° as illustrated in FIG. 5. The opposite equal length edges of the soil working portion of each hoe blade 64 are beveled to form cutting edges and each such soil working portion is so disposed that the point which is formed at the junction of said bevelled edges is at a lower level than is the rearmost recessed "base" edge thereof. It will be apparent that the angle $\alpha$ is also the inclination of the lower bevelled edge of each tine 30A to a line which is perpendicular to the front and rear edges of that tine.

The tines 47 which afford the elongate elements that are connected to the leading carrier beam 43 of the implement are, like the tines 30 or 30A, strip-shaped and are arranged with their substantially vertically disposed general planes in parallel or substantially parallel relationship with the direction A. The tines 47 project downwardly and rearwardly relative to the direction A from the carrier beam 43 and give a levelling and loosening pretreatment to at least an uppermost top soil layer of the ground that is to be cultivated or tilled by the following tines 30. As previously described, the tines 47 can be moved upwardly or downwardly relative to the frame by arranging different ones of the holes 36 and 41 in the arms 38 to co-operate with the pins 37 and bolts 40, respectively. In addition, the angle of attack of the tines 47 can be changed by turning the arms 38 about the substantially horizontally aligned pins 37 and retaining any newly chosen setting by entering the bolts 40 through appropriate holes in the lugs 42. These adjustments are made having regard to the nature and condition of the soil that is to be dealt with and the maximum depth of penetration of the tines 30 into the soil which has been chosen by upward or downward bodily adjustment of the roller 54 relative to the implement frame. The soil levelling member 34 that follows the tines 30 acts to level the earth that has been treated by the tines 47 and tines 30 and will tend further to pulverise at least an uppermost layer of the top soil. Finally, the freely rotatable roller 54, which acts as a rotatable supporting member and depth control member of the implement, moves over the treated soil performing a further crumbling action upon any stubborn lumps of soil that remain uncrushed at, or near to, the surface thereof, the roller also acting to produce a smooth and level surface which is gently compressed to some extent. It is noted that the action of the soil working tines 30 can be varied to increase or decrease the crumbling effect which they will have upon the earth by temporarily removing the pivot bolts 15 and connecting the control links 16 to the lugs 12 or 13 or to the lugs 12 and 13, as may be considered necessary, by re-employing the pivot bolts 15 in co-operation with alternative pairs of the holes 14. The shapes of the paths that are moved through by the points of the tines 30 in one or both of the rows of those tines will be changed by reconnecting the control links 16 to the lugs 12 or 13 or to the lugs 12 and 13, by using alternative pairs of holes 14, as has just been described.

Although certain features of the soil cultivating implement that has been described and/or that is illustrated in the accompanying drawings will be set forth in the following claims as inventive features, it is emphasised that the invention is not necessarily limited to those features and that it includes within its scope each of the parts of the soil cultivating implement that has been described, and/or that is illustrated in the accompanying drawings, both individually and in various combinations.

What we claim is:

1. A soil cultivating implement comprising a frame and soil working means mounted on at least one elongated support that extends transverse to the direction of travel, said support being pivoted to the frame and driving means connected to move said soil working means to and fro, in directions that are substantially parallel to the direction of travel, a soil levelling and pulverising member being connected to said support, said member being displaceable with said support during operation, a forward soil levelling member having a plurality of elongate elements being mounted on the implement in front of said soil working means, each of said elongate elements extending substantially in the direction of travel.

2. An implement as claimed in claim 1 wherein said pulverising member is connected to said support and located to the rear of said soil working means.

3. An implement as claimed in claim 2, wherein the pulverising member extends across the length of said support.

4. An implement as claimed in claim 3, wherein said pulverising member is freely pivotable relative to said support.

5. An implement as claimed in claim 4, wherein the pulverising member is freely pivotable about an axis that extends transverse to the direction of travel.

6. An implement as claimed in claim 5, wherein the pulverising member comprises an elongated bent plate.

7. An implement as claimed in claim 6, wherein said bent plate has two ribs which extend substantially parallel to the length of the plate.

8. An implement as claimed in claim 6, wherein the front of the pulverising member comprises an upwardly and forwardly inclined region, and wherein the rear of the plate comprises a substantially horizontally disposed region, both being positioned to contact the ground.

9. An implement as claimed in claim 1, wherein each elongate element is a strip having a general plane in substantially parallel relationship with the direction of travel.

10. An implement as claimed in claim 9, wherein the elongate elements are inclined obliquely downwardly and rearwardly with respect to the direction of travel.

11. An implement as claimed in claim 10, wherein said elongate elements are mounted on a common carrier which is pivotable upwardly and downwardly relative to said frame and means connecting the common carrier to the frame at varying non vertical distances from said frame.

12. An implement as claimed in claim 11, wherein said common carrier is pivotable about an axis located to the rear thereof.

13. An implement as claimed in claim 12, wherein said common carrier is connected to arms that are pivoted to the frame, and arms are extendible and retractable in a direction that is substantially parallel to the lengths of said arms.

14. A soil cultivating implement comprising a frame and elongated tool carrier supports pivoted to said frame, driving means including transmission shaft means and a corresponding eccentric connected to each of said supports, said supports being spaced apart and said shaft means being located between the supports when viewed in plan, each eccentric including an output element that is linked to a respective support and a control member that is pivoted to the frame, means adjusting said control member to vary the motion of said output element.

15. An implement as claimed in claim 14, wherein there are four eccentrics that comprise two separate and opposed pairs of eccentrics.

16. An implement as claimed in claim 15, wherein said two opposed pairs of eccentrics are spaced apart from one another.

17. An implement as claimed in claim 16, wherein the two pairs of eccentrics are located adjacent opposite ends of a driving shaft of said shaft means.

18. An implement as claimed in claim 17, wherein the eccentrics of each opposed pair are about 180° out of register with each other as regards their eccentricities.

19. An implement as claimed in claim 14, wherein the output element includes a support element and a corresponding carrier support with tines is fastened to that support element.

20. An implement as claimed in claim 19, wherein each carrier support comprises at least one beam of channel-shaped cross-section, that has limbs projecting downwardly from a base thereof.

21. An implement as claimed in claim 20, wherein each carrier support includes a second beam of channel-shaped cross-section nested inside the first channel-shaped beam, the free edges of limbs of the second, inner beam registering with the free edges of the corresponding limbs of the first outer beam, fastening means securing the tines and the first and second beams to one another.

22. An implement as claim in claim 21, wherein said tines are connected to their respective supports in staggered relationship, the members that correspond to one support being located in spaces between the members that correspond to a second support, when viewed from the rear.

23. An implement as claimed in claim 14, wherein said tools are tines that are formed from strip-shaped material and the planes of the tines being substantially parallel to the direction of travel.

24. An implement as claimed in claim 23, wherein the lower end of each tine comprises a single bevelled edge and a point at the junction between said bevelled edge and a leading edge of the tine.

25. An implement as claimed in claim 23, wherein the lower ends of said tines comprise corresponding hoe blades.

26. An implement as claimed in claim 14, wherein said control member is a control link that pivots the frame to a lug on an output element of the respective eccentric, adjusting means interconnecting the control link to the frame at any chosen one of a plurality of different positions.

27. An implement as claimed in claim 14, wherein a soil levelling and pulverising member is pivoted to a support and movable with that support.

28. A soil cultivating implement comprising a frame and elongated tool carrier supports pivoted to said frame, driving means including a transmission shaft and corresponding pairs of eccentrics mounted on said shaft, said shaft being located between said supports when viewed in plan, each pair of eccentrics having upper lugs pivoted to frame beams of the frame and lower brackets connected to the supports, fore and aft of the shaft, said supports mounting tines that are movable in directions generally parallel to the direction of travel.

29. An implement as claimed in claim 28, wherein the opposite ends of said beams are connected to said plates and a supporting roller is adjustably connected to the plates by pivotable arms.

30. An implement as claimed in claim 29, wherein the ground-engaging periphery of said roller comprises a plurality of elongate elements that extend helically around the axis of rotation of the roller.

* * * * *